United States Patent
Jana et al.

(10) Patent No.: US 12,170,366 B2
(45) Date of Patent: Dec. 17, 2024

(54) PREPARATION OF SILICON-BASED ANODE FOR USE IN A LI-ION BATTERY

(71) Applicant: THE BOARD OF REGENTS FOR THE OKLAHOMA AGRICULTURAL AND MECHANICAL COLLEGES, Stillwater, OK (US)

(72) Inventors: Malay Jana, West Bengal (IN); Raj N. Singh, Tulsa, OK (US)

(73) Assignee: The Board of Regents for The Oklahoma Agricultural and Mechanical Colleges, Stillwater, OK (US)

(*) Notice: Subject to any disclaimer, the term of this patent is extended or adjusted under 35 U.S.C. 154(b) by 714 days.

(21) Appl. No.: 17/420,603

(22) PCT Filed: Jan. 6, 2020

(86) PCT No.: PCT/US2020/012380
§ 371 (c)(1),
(2) Date: Jul. 2, 2021

(87) PCT Pub. No.: WO2020/146264
PCT Pub. Date: Jul. 16, 2020

(65) Prior Publication Data
US 2022/0085363 A1   Mar. 17, 2022

Related U.S. Application Data (60) Provisional application No. 62/789,281, filed on Jan. 7, 2019.

(51) Int. Cl.
*H01M 4/00* (2006.01)
*H01M 4/04* (2006.01)
(Continued)

(52) U.S. Cl.
CPC ......... *H01M 4/386* (2013.01); *H01M 4/0457* (2013.01); *H01M 4/0471* (2013.01); *H01M 4/583* (2013.01); *H01M 2004/021* (2013.01)

(58) Field of Classification Search
CPC .......... H01M 4/38; H01M 4/583; H01M 4/04
See application file for complete search history.

(56) References Cited

U.S. PATENT DOCUMENTS 5,637,260 A    6/1997  Okuda et al.
8,597,831 B2  12/2013  Green et al.
(Continued)

FOREIGN PATENT DOCUMENTS

CN   109546106 A   *   3/2019
WO   2004042851 A2    5/2004
(Continued)

OTHER PUBLICATIONS

Dong et al, A Preparation Method Of Silicon-Carbon Negative Electrode Material With High Performance, Mar. 2019, See the Abstract. (Year: 2019).*

(Continued)

*Primary Examiner* — Anca Eoff
*Assistant Examiner* — Monique M Wills
(74) *Attorney, Agent, or Firm* — McAfee & Taft (57) ABSTRACT

Disclosed is a composition suitable for use as an anode in a lithium ion rechargeable batter. The composition includes milled silicon powder particles and superconducting carbon particles. A carbon coat covers the surface of each milled silicon particle and encapsulates a plurality of superconducting carbon particles. Also, disclosed is a method of preparing the disclosed composition.

27 Claims, 12 Drawing Sheets

(51) Int. Cl.
   *H01M 4/38*     (2006.01)
   *H01M 4/583*    (2010.01)
   *H01M 4/02*     (2006.01)

(56) References Cited

U.S. PATENT DOCUMENTS

| | | |
|---|---|---|
| 8,637,185 B2 | 1/2014 | Berdichevsky et al. |
| 8,741,254 B2 | 6/2014 | Lee et al. |
| 9,012,079 B2 | 4/2015 | Green |
| 9,281,104 B2 | 3/2016 | Sun |
| 9,871,249 B2 | 1/2018 | Green |
| 10,381,641 B2 | 8/2019 | Chen et al. |
| 2009/0130562 A1 | 5/2009 | Mao et al. |
| 2010/0233539 A1 | 9/2010 | Green et al. |
| 2013/0122717 A1 | 5/2013 | Green et al. |
| 2013/0120769 A1 | 9/2013 | Xu |
| 2013/0252101 A1 | 9/2013 | Zhou et al. |
| 2014/0248543 A1 | 9/2014 | Zhu et al. |
| 2016/0310924 A1 | 10/2016 | Nakatomi et al. |
| 2017/0346084 A1 | 11/2017 | Sakshaug et al. |
| 2017/0352878 A1 | 12/2017 | Kajita |

FOREIGN PATENT DOCUMENTS

| | | |
|---|---|---|
| WO | 2010128310 A1 | 11/2010 |
| WO | 2018156775 | 8/2018 |

OTHER PUBLICATIONS

Yang et al., A Preparation Method Of Silicon-Carbon Negative Electrode Material With High Performance, Mar. 2019, See the Abstract. (Year: 2019).*

Ashuri et al., Hollow Silicon Nanospheres Encapsulated with a Thin Carbon Shell: An Electrochemical Study, Electrochimica Acta 215 2016.

Astrova et al., Electrochemical Characteristics of Nanostructured Silicon Anodes for Lithium-Ion Batteries, Semiconductors, vol. 50, No. 2. 2016.

Dash et al., Retraction Note: Theoretical Limits of Energy Density in Silicon-Carbon Composite Anode Based Lithium Ion Batteries Jun. 17, 2016.

Fukata et al., Lithium ion battery anodes using Si—Fe based nanocomposite structures, Nano Energy 2016.

Kim et al, Enhancement of the electrochemical performance of silicon anodes through alloying with inert metals and encapsulation by graphene nanosheets, Electrochimica Acta 209, 2016.

Lee et al, Kinetics and fracture resistance of lithiated silicon nanostructure pairs controlled by their mechanical interaction, Nature Communications 2015.

Lee et al., Fracture of crystalline silicon nanopillars during electrochemical lithium insertion, PNAS, vol. 109, No. 11 2012.

Nie et al., Silicon Solid Electrolyte Interphase (SEI) of Lithium Ion Battery Characterized by Microscopy and Spectroscopy, Phys. Chem C , 117 2013.

Novikov et al., Electrochemical performance and surface chemistry of nanoparticle Si@SiO2 Li-ion battery anode in LiPF6-based electrolyte, Electrochimica Acta 208, 2016.

Schulz et al., Si6H12/Polymer Inks for Electrospinning a-Si Nanowire Lithium Ion Battery Anodes, Electrochemical and Solid-State Letters, 13(10) 2010.

Wang et al., Ag-deposited 3D porous Si anodes with enhanced cycling stability for lithium-ion batteries, Materials Letters 185 2016.

Zhang, et al., Hollow Si/C composite as anode material for high performance lithium-ion battery, Powder Technology 299 2016.

Georgakilas et al., Broad Family of Carbon Nanoallotropes: Classification, Chemistry, and Applications of Fullerenes, Carbon Dots, Nanotubes, Graphene, Nanodiamonds, and Combined Superstructure, Chemical Reviews, vol. 115, May 27, 2015, pp. 4744, 4770, 4797.

PCT International Search Report & Written Opinion mailed in corresponding PCT Application No. PCT/US2020/012380 on Jun. 29, 2020, pp. 1-18.

* cited by examiner

| Electrode material | | Contact Resistance, $R_C$ ($\Omega$) | Total Resistance, $R_S$ ($\Omega$) | Net Electrode Resistance, $R_E$ ($\Omega$) |
|---|---|---|---|---|
| 24hr milled Si | Before cycling | 11.4 | 75.6 | 64.2 |
| | After 50 cycles (failed) | 22.3 | 212.6 | 190.3 |
| C@24hr milled Si* | Before cycling | 5.8 | 36.0 | 30.2 |
| | After 200 cycles | 31.2 | 99.6 | 68.4 |
| 96hr milled Si | Before cycling | 12.5 | 54.6 | 42.1 |
| | After 50 cycles (failed) | 22.5 | 252.6 | 230.1 |
| C@96hr milled Si* | Before cycling | 11.4 | 48.3 | 36.9 |
| | After 200 cycles | 22.5 | 130.9 | 108.4 |

FIG. 5

Electrochemical impedance parameters obtained from Fig. 4A

| Cycling number | Temperature (°C) | Contact Resistance, $R_C$ (Ω) | Total Resistance, $R_S$ (Ω) | Net Electrode Resistance, $R_E$ (Ω) |
|---|---|---|---|---|
| Before cycling | 22 (RT) | 5.2 | 48.6 | 43.4 |
| After 20 cycles | 40 | 7.0 | 158.4 | 151.4 |
|  | RT | 22.4 | 292.6 | 270.2 |
| After 30 cycles (20+10) | RT | 9.3 | 162.4 | 153.1 |
| After 50 cycles (30+20) | 50 | 7.2 | 197.5 | 190.3 |
|  | RT | 13.3 | 333.4 | 320.1 |
| After 70 cycles (50+20) | 60 | 13.9 | 156.9 | 143.0 |
|  | RT | 12.7 | 372.3 | 359.6 |
| After 90 cycles (70+20) | 30 and 20 | 9.6 | 260.3 | 250.7 |
| After 110 cycles (90+20) | 25 | 26.0 | 241.6 | 215.6 |

PREPARATION OF SILICON-BASED ANODE FOR USE IN A LI-ION BATTERY

CROSS REFERENCE TO RELATED APPLICATIONS

The present application claims priority to U.S. Provisional Application No. 62/789,281 filed on Jan. 7, 2019.

BACKGROUND

Li-ion batteries are currently used in a variety of applications from electronic devices to electric cars. These applications demand batteries with small size, high capacity and energy density. While advances have been made in the area of the cathode for such batteries, most Li-ion batteries continue to use graphite as the anode. Unfortunately, graphite has a maximum theoretical specific capacity of only 372 mAh g$^-$. As a result, the anode capacity has become a limiting factor in the development and use of Li-ion batteries.

SUMMARY

In one embodiment the present disclosure describes a composition comprising particles of silicon powder, particles of superconducting carbon powder with a carbon coating layer on each particle of silicon powder. The carbon coating layer encapsulates at least one particle of superconducting powder and the carbon coating layer substantially encapsulates the silicon powder.

In another embodiment, the present disclosure describes an anode. The anode comprises an anode active material. The anode active material includes particles of silicon powder ranging in size from about 0.1 µm to about 0.5 µm and particles of superconducting carbon. The particles of super conducting carbon range in size from about 5 nm to about 100 nm. A carbon coating is present on each of the particles of silicon powder and the carbon coating encapsulates the particle of silicon powder and encapsulates a plurality of superconducting carbon particles. The particle sizes of the anode active material may range from about 0.5 µm to about 2 µm. The anode also includes a binder and a metal foil.

Also disclosed is a method for preparing an anode active material. The method comprises the steps of:
- forming a suspension of milled silicon powder particles and superconducting carbon particles in a solvent capable of undergoing a poly-condensation reaction or condensation reaction;
- initiating the poly-condensation reaction or condensation reaction by adding a sufficient quantity of a mineral acid to the suspension of milled silicon powder and superconducting carbon particles, wherein said reaction forms a carbon coating on the surface of individual milled silicon powder particles and said resulting carbon coating encapsulates superconducting carbon particles.

DETAILED DESCRIPTION

The drawings included with this application illustrate certain aspects of the embodiments described herein. However, the drawings should not be viewed as exclusive embodiments. Also, the description is not to be considered as limiting the scope of the embodiments described herein. Throughout this disclosure, the terms "about", "approximate", and variations thereof, are used to indicate that a value includes the inherent variation or error for the device, system, the method being employed to determine the value, or the variation that exists among the study subjects.

To overcome the shortcomings of conventional graphite anodes, the present disclosure provides an improved anode based on silicon and methods for preparing a silicon-based anode. The improved anode is prepared from silicon particles coated with carbon and subsequently treated with superconducting carbon and a binding agent.

Thus, in one embodiment, the present disclosure provides a method of preparing an anode from crystalline silicon powder. The crystalline silicon powder starting material may be selected from the group of crystalline silicon characterized as elemental silicon or silicon doped with boron, phosphorus or other similar dopants suitable for use in anodes or polycrystalline silicon particles. The crystalline silicon powder starting material will typically have particles sizes ranging from about 0.3 μm to about 100 μm and a quality of at least metallurgical grade. For the purposes of the following discussion, the selected starting material is referred to as silicon powder.

Preparation of Silicon Based Anode Material

Preparation of the anode begins with dispersing the silicon powder in a liquid medium such as, but not limited to, water, ethyl alcohol, butanol, methyl alcohol, acetone or mixtures thereof. The resulting dispersion will contain from about 5 percent by volume to about 40 percent by volume silicon powder. The resulting dispersion is placed in a milling device and milled at room temperature, e.g. between about 15° C. and 30° C., for a period of time sufficient to reduce the silicon powder to a particle size of about 0.1 to about 0.5 micrometer. Typical milling times will vary by milling device. Suitable milling devices include, but are not limited to: ball milling devices, attritor mill, or vibratory mill. Upon completion of the milling operations, the silicon powder is isolated and dried. The resulting silicon powder typically has less than 0.1 percent residue of the liquid suspending medium.

After drying, the milled silicon powder is mixed with superconducting carbon at a ratio of about 90:10 to about 30:70 using Furfuryl alcohol (FFA) as a suspending medium and carbon contributing source. Alternative suspending mediums/carbon contributing sources include but are not limited to butyl alcohol, or any other alcohol or other solvent suitable for undergoing a condensation or poly-condensation polymerization reaction thereby acting as a source of carbon. The superconducting carbon suitable for use in this method has a size range of about 5 nm to about 100 nm and a conductivity of about $2-4\times10^5 Sm^{-1}$. Preferably, the superconducting carbon will have a purity of about 80% to about 100%. More preferably, the superconducting carbon will be of about 97.5% purity.

In order to ensure a homogeneous dispersion of silicon powder and superconducting carbon, one approach provides for initially preparing separate dispersions of each component prior to mixing the two components together. In this embodiment, the silicon powder is dispersed within a liquid dispersing agent such as, but not limited to, ethanol, methanol, acetone to provide a dispersion containing from about 10% to about 70% silicon powder on a percent by weight basis. The suspension of silicon powder is then sonicated to disperse the particles and breakup any agglomerations. After sonication, the suspending agent is removed and the particles dried. Likewise, the superconducting carbon is dispersed within a liquid dispersing agent such as, but not limited to, ethanol, methanol, acetone to provide a dispersion containing from about 10% to about 70% super conducting powder on a percent by weight basis. The suspension of superconducting carbon is then sonicated to disperse the particles and breakup any agglomerations. After sonication, the suspending agent is removed and the particles dried.

Subsequently, the dried particles of superconducting carbon and silicon powder are mixed together with the addition of a carbon contributing solvent such as, but not limited to, furfuryl alcohol, butyl alcohol or any other solvent capable of providing a source of carbon. The primary requirement of the carbon contributing solvent being the ability to suspend the silicon powder and superconducting carbon and to form a polymer upon the addition of a suitable acid. The resulting mixture of the silicon powder dispersion and superconducting carbon dispersion in the carbon contributing solvent has a make up of about 10% to about 70% by weight of silicon powder, about 1% to about 10% by weight superconducting carbon and about 10% to about 90% by weight carbon contributing solvent. The resulting suspension of components is subjected to sonication or other dispersion inducing operation to ensure de-agglomeration of substantially all particles.

Upon completion of the dispersion step, an acid suitable for initiating the poly-condensation of furfuryl is added to the mixture with stirring or agitation. Suitable acids include mineral acids, such as but not limited to, nitric acid, hydrochloric acid, sulfuric acid and mixtures thereof. Generally, nitric acid having a 10 molarity will be sufficient to initiate poly-condensation. Likewise, sulfuric acid of 10 molarity or hydrochloric acid of 10 molarity will also provide the necessary catalyst for the poly-condensation reaction. The time necessary for completion of the polymerization reaction will vary based on the temperature of the mixture. Generally, from about 5 minutes to about 60 minutes will be sufficient to provide for completion of the reaction. The volume of acid will vary with the volume of furfuryl or other carbon contributing alcohol. Generally, only the amount necessary to initiate the poly-condensation reaction will be used.

Upon completion of the polymerization reaction, the resulting material is dried at a temperature between about 70° C. and about 150° C. for a period of about two hours to about twelve hours. More typically, the resulting material is dried at a temperature of about 100° C. for about two hours. Following drying, the polymerized material containing silicon powder and superconducting carbon is further heat treated in a furnace or oven to convert the polymer to a carbon coating on the individual silicon particles. The carbon coating also contains or encompasses the super conducting carbon particles. Preferably, the carbon coating encapsulates both the silicon particle and super conducting carbon particles.

The heat treatment includes a first step wherein the polymerized material is heated from room temperature at a rate of about 2° C./min to about 5° C./min to a first intermediate temperature between about 300° C. and 600° C. The first intermediate temperature is maintained for about thirty minutes to about three hours. Following completion of the first heating step, the temperature is further increased at a rate of about 2°/min to about 5° C./min to a second intermediate temperature between about 600° C. and 800° C. The second intermediate temperature is maintained for about thirty minutes to about three hours. Following completion of the second heating step, the temperature is further increased at a rate of about 5°/min to about 10° C./min to a final temperature between about 900° C. and 1200° C. The final temperature is maintained for about one hour to about five hours. In most instances the first heating step will stop at a temperature of about 550° C. and the second heating step will stop at temperature of about 750° C. and the first and second intermediate temperatures will be maintained for about one hour. In most instances, the final heating step will conclude at a temperature of about 950° C. and be maintained for about two hours.

Figure 12A:
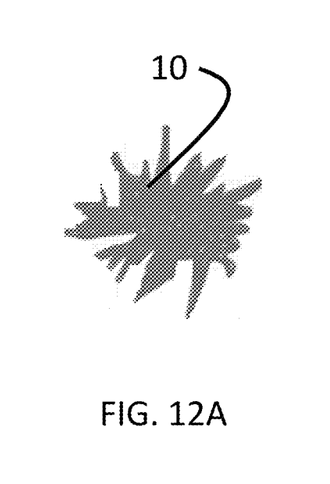
FIG. 12A depicts a likely configuration of a milled silicon powder particle.
Figure 12B:
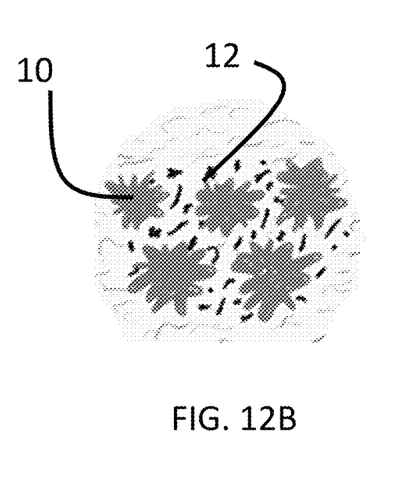
FIG. 12B depicts milled silicon powder particles and super conducting carbon particles suspended in a carbon contributing solvent such as furfuryl.
Figure 12C:
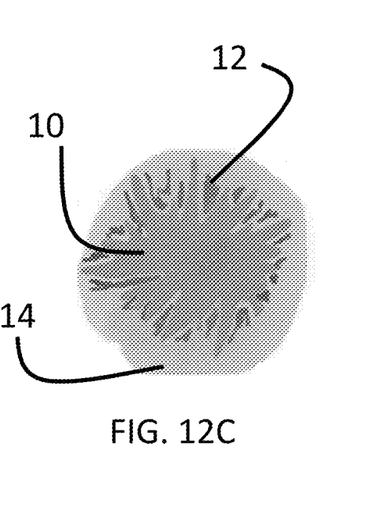
FIG. 12C depicts a potential final structure of a silicon powder particle with super conducting carbon particles all of which are encapsulated within a carbon coating layer.

If necessary, to provide the desired final particle size, the heat treated material is subsequently reduced to provide particles of about 0.5 μm to about 2 μm. In this instance, particle size reduction merely involves breaking up clumps or agglomerations of particles as it is desired to maintain the carbon coating intact as an encapsulating or at least substantially encapsulating layer on the silicon powder with the super conducting carbon also captured and preferably encapsulated within the carbon coating layer. Thus, the resulting particles are characterized as a carbon coated silicon powder encapsulated or at least substantially encapsulated by a carbon layer with superconducting carbon encapsulated within the carbon coating layer. Additionally, the resulting carbon encapsulated particles are suitable for use as anode active material in lithium ion rechargeable batteries. FIG. 12A provides a theoretical depiction of a milled silicon powder particle 10. FIG. 12B provides a theoretical example of milled silicon powder particles 10 and superconducting carbon particles 12 dispersed in Furfuryl. FIG. 12C provides a theoretical example of the carbon coated milled silicon powder 10 with superconducting carbon particles 12 encapsulated within carbon coating 14.

Preparation of an Anode

The resulting particles of carbon coated silicon powder with superconducting carbon encapsulated within the carbon coating layer are particularly suited for use as an anode in a lithium ion rechargeable battery. For the purposes of this portion of the discussion the material provided above is referred to as the Anode Active Material. Preparation of the anode follows a conventional anode preparation step; however, the commonly used graphite has been replaced with the Anode Active Material.

Typically, the Anode Active Material will be combined with a binder, a solvent and an additional conductive carbon. In the following examples the binder was polyvinylidene fluoride and the solvent was N-Methylpyrrolidine; however, any conventional binder and solvent commonly used in the preparation of anodes will also be appropriate. Suitable conductive carbons include, but are not limited to, superconducting carbon, graphene, carbon nanotubes, and graphene. The resulting mixture is blended using magnetic stirrer and allowed to form a slurry. The resulting slurry is then coated on a metal foil suitable for supporting the anode within a battery cell using a tape casting technique. Typically, the foil will be copper. The coated metal foil is heated sufficiently to remove the solvent. The resulting material is suitable for use as an anode in a lithium ion rechargeable battery. In general, the resulting anode material will contain from about 10% by weight to about 85% by weight of the Anode Active Material.

EXAMPLES

The following lab scale examples are provided to further exemplify the reduction to practice of the above described method and composition. In these examples, both half and full cells were prepared using the anode material described above.

Figure 1:
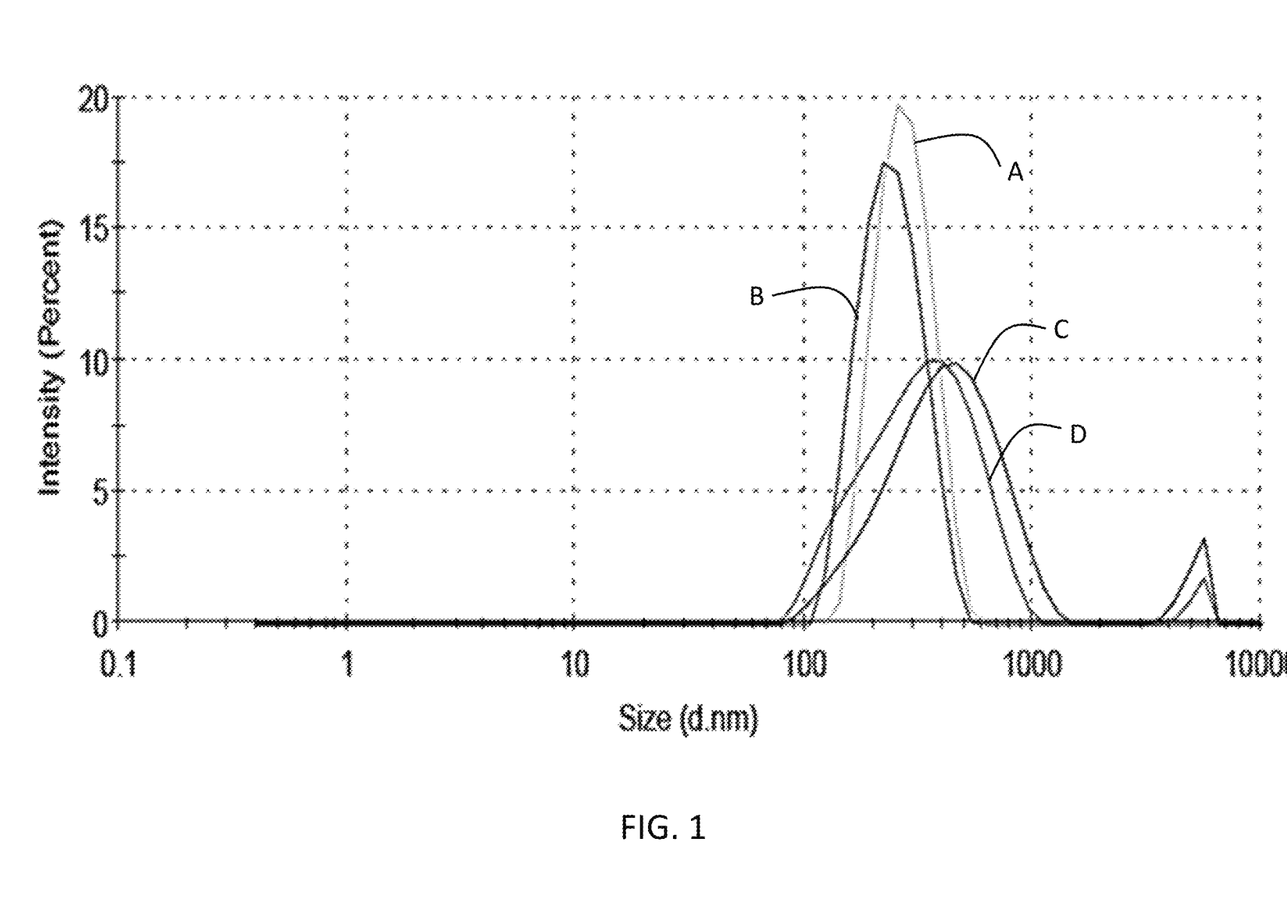
FIG. 1 depicts the mean particle size of milled silicon particles.

To demonstrate the ability to provide silicon powder having particles of the desired size, polycrystalline micron size silicon particles were ball milled using zirconia balls, ethanol and 30 g of silicon particles in a single batch. The milling durations were set to 24 h, 48 h, 96 h and 168 h. The size of the particles was measured time to time during milling. As represented by FIG. 1, milling reduced the average particle size of the silicon powder as follows: (a) after 24 hours the average particle size was 350 nm (Line D in FIG. 1); (b) after 48 hours the average particle size was 300 nm (Line A in FIG. 1); (c) after 96 hours the average particle size was 250 nm (Line B in FIG. 1); and, (d) the 168 hour milling time period was deemed non-effective (Line C in FIG. 1), perhaps due to erosion of the zirconia balls.

The 24 hour milled particles and 96 hour milled particles were selected to prepare anodes for use in coin cells for comparison testing. Coin cells prepared using anode material produced according to the foregoing method were prepared as follows.

The carbon coated silicon powder with encapsulated super conducting carbon was mixed with an additional amount (5 wt. %) of superconducting carbon (97.5%, US Research Nanomaterials, Inc.) and 10 wt. % of polyvinylidene fluoride (PVdF) in an N-Methylpyrrolidine (97%, Sigma-Aldrich) solution overnight to make the slurry. The slurry was coated on copper foil (9 μm thick 99.99%, MTI Corp.). After drying the organic solvent at 120° C. using a hot plate, the coated foil was then transferred to a vacuum oven for storage. The coated foil was pressed using a laminating press to a uniform thickness. The pressed electrode was cut into small pieces of 1 $cm^2$ to act as an anode.

The electrochemical tests were performed in 2032 type coin cell with both half and full cell arrangements. For the half cell, Li metal (MTI Corp.) was used as the counter electrode and for full cell Toda NCM 523 ($LiNi_{0.5}Co_{0.2}Mn_{0.3}O_2$; provided by Argonne National Lab) was used as cathode against the silicon-based anode. The electrolyte used was 1.0 M LiPF6 in 1:1 (w/w) ethylene carbonate/diethyl carbonate (BASF). 'Celgard' separator was used for coin cells after soaking it in the electrolyte. Electrochemical impedance spectroscopy measurements were carried out using VersaSTAT 4 (Princeton Applied Research) potentiostat between 1 MHz and 10 MHz. Battery cycling was performed using a MACCOR battery tester (4300M). The voltage cutoff was set to 1.5 V and 1 mV versus Li/Li+, and the cycling current was set to 0.8 A/g (unless stated otherwise) for half cells. Full cells were tested between the voltage window of 2.7-4.2V at a current density of 200 mA/g.

To provide a comparison, uncoated milled silicon powder was also prepared according to the same protocol as an anode in 2032 type coin cells as described above.

Figure 2:
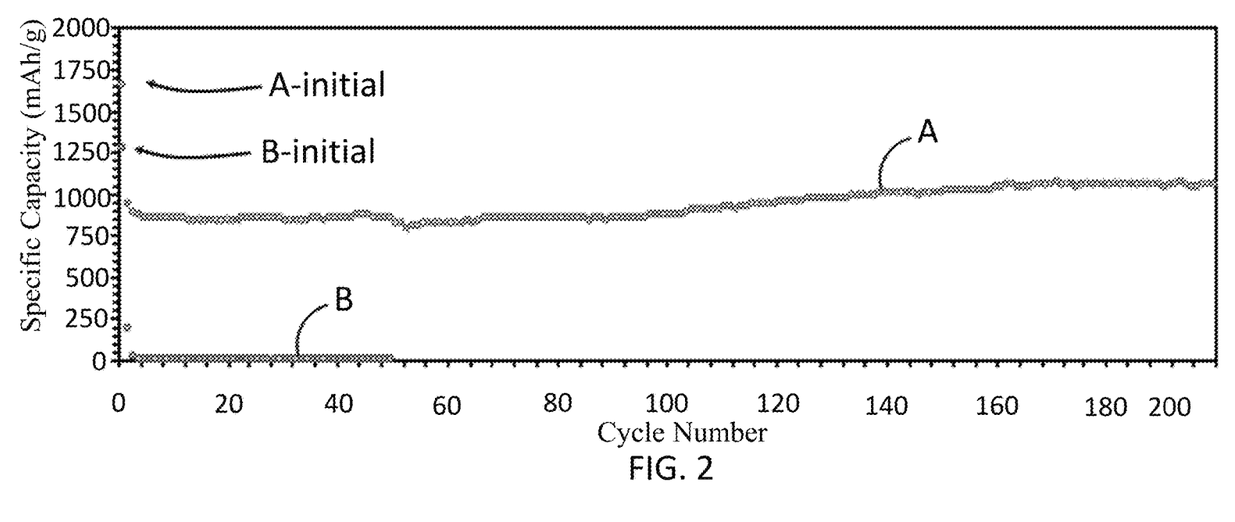
FIG. 2 depicts the cycling performance of cells made using the carbon coated silicon powder and uncoated silicon powder where the silicon had been milled for 24 hours.

The cycling performances of cells having anodes prepared from the coated silicon powder and uncoated silicon powder are depicted in FIG. 2. As reflected in FIG. 2, the cell using an anode prepared from uncoated silicon powder failed after only two cycles (Line B in FIG. 2) and had an initial capacity of about 1250 mAh/g (B-initial in FIG. 2). In contrast, the cell containing an anode prepared from the carbon coated silicon powder of the present invention showed a reversible capacity of 1050 mAh/g after 200 cycles (Line A in FIG. 2) with an initial capacity of 1658 mAh/g (A-initial in FIG. 2). Additionally, one can also observe steady increase in the overall capacity as the cycle number increases.

Figure 3:
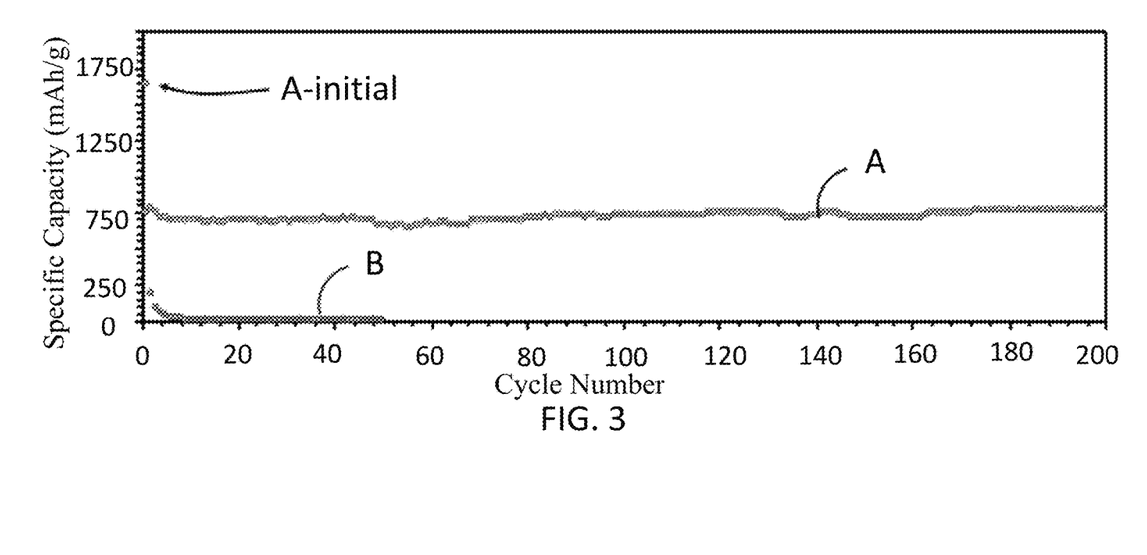
FIG. 3 depicts the cycling performance of cells made using the carbon coated silicon powder and uncoated silicon powder where the silicon had been milled for 96 hours.

FIG. 3 depicts the cycling performance of cells prepared from silicon powder milled for 96 hours. The preparation of the anodes and cells followed the same protocols outline above. As reflected in FIG. 3, at A-initial, the cell containing the anode prepared from carbon coated silicon powder started with a specific capacity of ~1626 mAh/g. The capacity of the cell was measured at 757 mAh/g after 200 cycles (Line A in FIG. 3). In comparison, the cell prepared using the 24-hour milled carbon coated silicon powder had a capacity of 1050 mAh/g after 200 cycles. Thus, the 24-hour milled carbon coated silicon powder demonstrated better capacity retention. However, the cell produced from the 96-hour material showed better stability with a lower reversible capacity than the 24-hour material. As with the 24-hour non-coated silicon powder, the 96-hour non-coated silicon powder also failed after two cycles (Line B in FIG. 3).

Figure 4A:
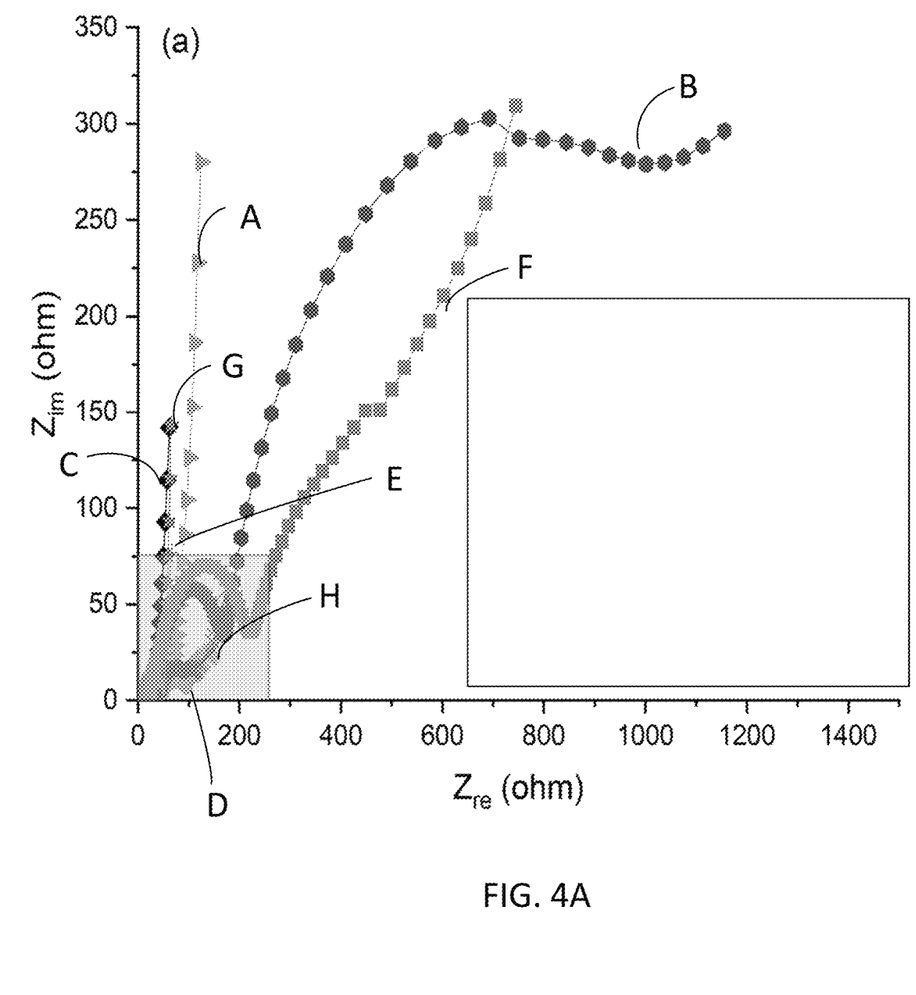
FIG. 4A depicts electrochemical impedance spectra from coated and uncoated electrodes before cycling and after cycling prepared from silicon powder milled for 24 hours and 96 hours.
Figure 4B:
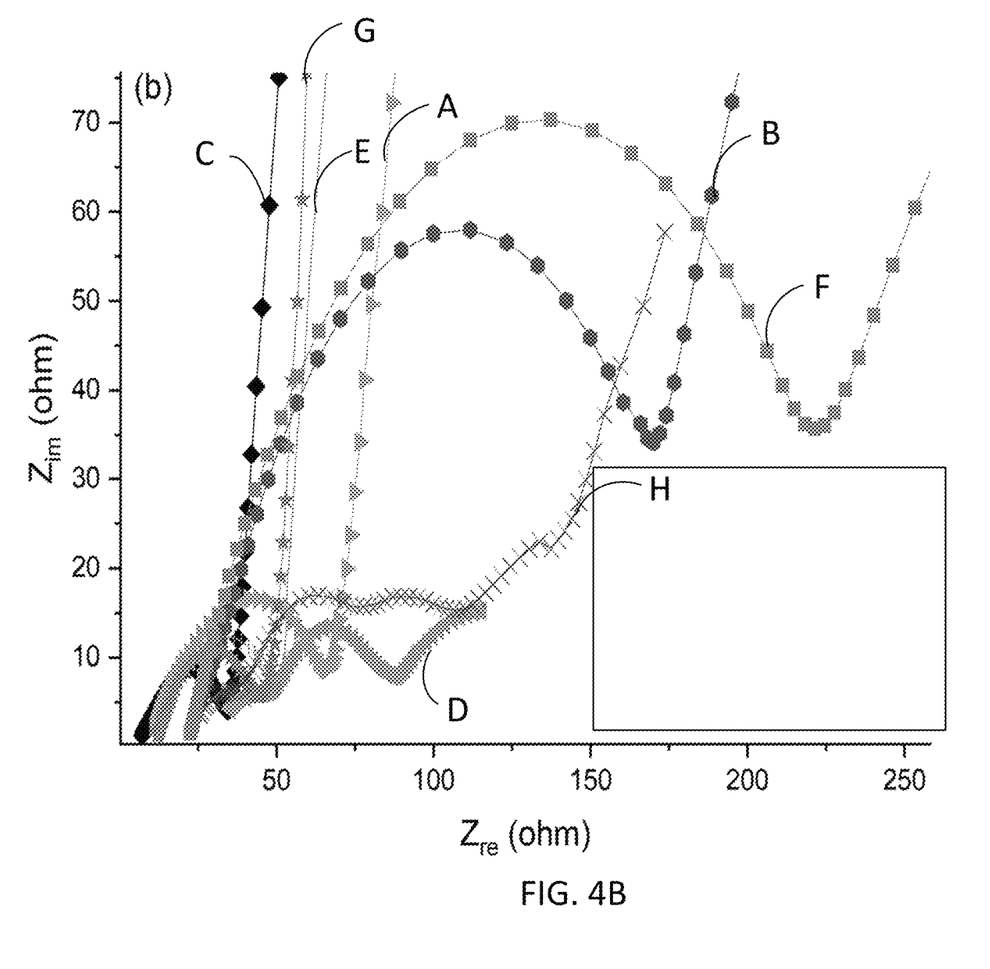
FIG. 4B depicts the enlarged view of the highlighted box in FIG. 4A.

The electrochemical impedance spectroscopy (EIS) of each of the electrode systems was investigated in this study and the results are shown in FIGS. 4A and 4B. FIG. 4B provides a magnified view of the highlighted box in FIG. 4A. In FIGS. 4A and 4B, Lines A-H represent the following: Line A—non-coated silicon powder milled for 24 hours, prior to cycling; Line B—non-coated silicon powder milled for 24 hours after 50 cycles, (failed); Line C—24-hour milled carbon coated silicon powder prior to cycling; Line D—24-hour milled carbon coated silicon powder after 200 cycles; Line E—non-coated silicon powder milled for 96 hours, prior to cycling; Line F—non-coated silicon powder milled for 96 hours after 50 cycles, (failed); Line G—96-hour milled carbon coated silicon powder prior to cycling; and, Line H—96-hour milled carbon coated silicon powder after 200 cycles.

Both the electrodes made using uncoated milled silicon (24 hour and 96 hour) particles show very high resistance (≥200Ω) after 50 cycles, after which the electrodes actually failed and the tests were terminated. In contrast, the carbon coated silicon powder prepared as described above was tested for 200 cycles resulting in a resistance level of ≤100Ω. Thus, despite the significant difference in cycles the uncoated electrodes showed at least 2-3 times more resistance (230.1Ω vs 68.4Ω) than the anode prepared from the coated silicon powder. As best seen in FIG. 4B, lines C and D, among all the electrodes, the one prepared from silicon powder milled for 24 hours and coated with carbon as described above demonstrated the lowest electrode resistance in both before and after cycling tests.

Figure 5:
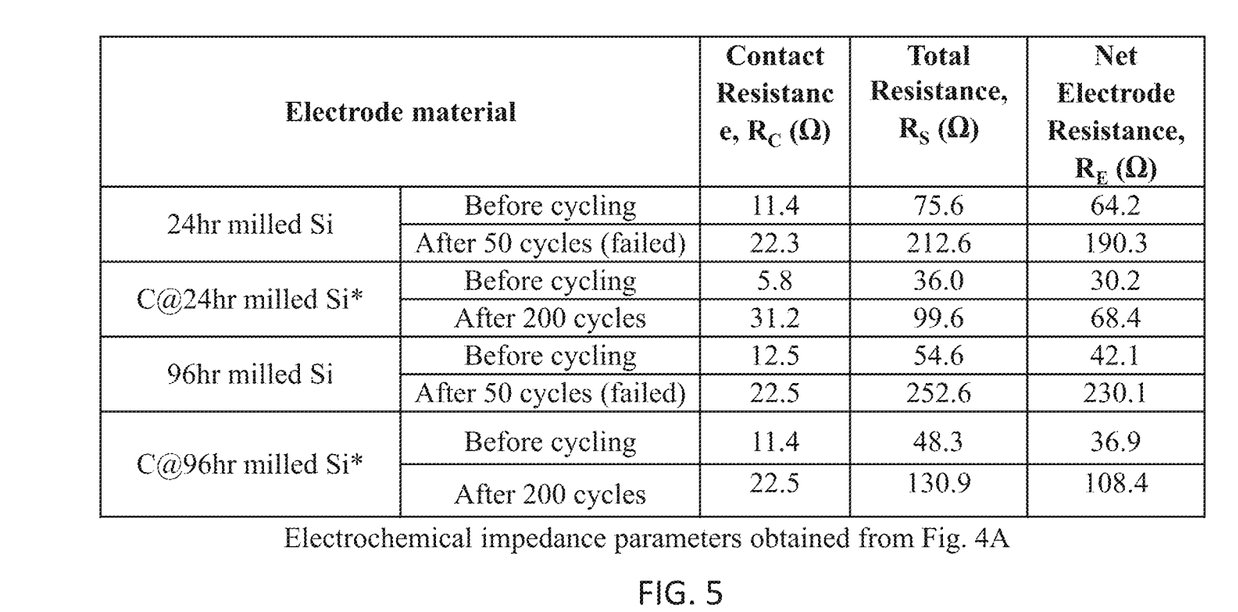
FIG. 5 provides a table reflecting the electrochemical impedance parameters obtained from the electrodes tested in FIG. 4A.

The effectiveness of the carbon coating in increasing the overall conductivity can be observed from the data summarized in FIG. 5. In FIG. 5 lines designated C@ reflect cells containing anodes prepared from milled silicon powder coated with carbon. Lines lacking the designation C@ reflect cells containing anodes prepared from milled silicon powder lacking carbon coating. As reflected in FIG. 5, in all samples cycling resulted in increased amount of contact resistance as compared to the fresh cells. The anode prepared from 24 hour milled silicon powder with a carbon coating, cycling up to 200 cycles resulted in resistance of ~68Ω, with an initial resistance of ~30Ω. For the anode prepared from 96 hour milled silicon powder with carbon coating, same number of cycles resulted in slightly higher electrode resistance ~108Ω vs. 37Ω for the fresh cell. In contrast to the performance provided by the carbon coated silicon powder, the electrodes prepared from uncoated silicon electrodes were cycled only 50 times. After 50 cycles these electrodes demonstrated resistances of 190Ω and 230Ω, respectively for 24 hour and 96 hour milled silicon powder without carbon coating. In turn the significant increase in the electrode resistance resulted in capacity loss as reported in FIGS. 2 and 3. This loss could be attributed to fracture and isolation of particles and/or uncontrolled formation of SEI layer.

Figure 6:
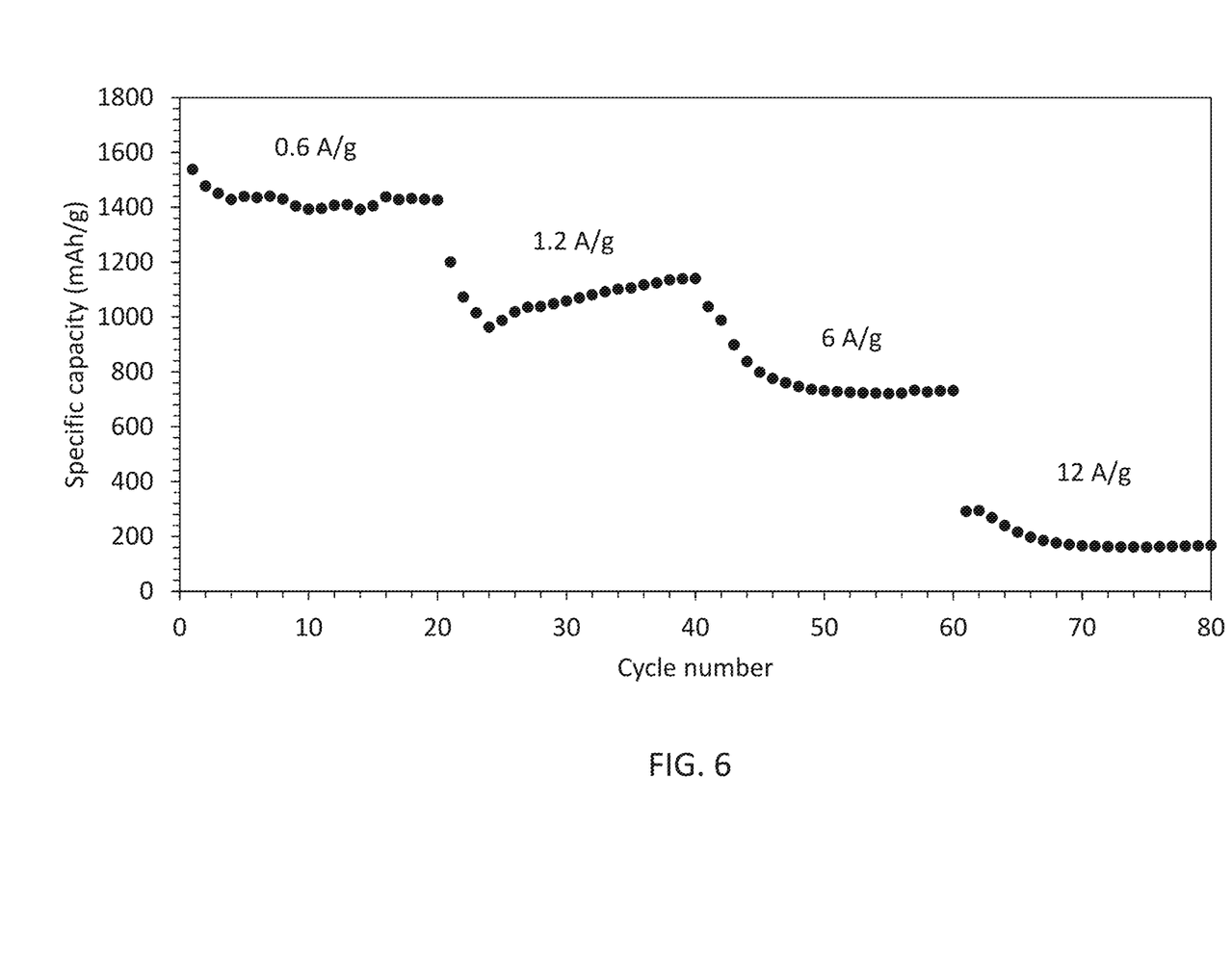
FIG. 6 depicts the rate test at various current densities of a carbon coated anode prepared in accordance with this disclosure using silicon powder milled for 24 hours.

To further demonstrate the advantages provided by the milled silicon powder with carbon coating and super conducing carbon prepared as described above, anodes prepared from the 24-hour milled silicon powder with the carbon coating were tested at various current densities. FIG. 6 depicts the results of this testing. To get a true picture of the effect of charging current, the cell was cycled for 80 cycles as per normal test procedure at 0.6 A/g before the higher rate test. A stable capacity of over 1400 mAh/g was obtained at 0.6 A/g. The capacity was decreased to about 1150 mAh/g when the current density was doubled (1.2 A/g). The test results exhibit excellent cycle-ability with high capacity of over 700 mAh/g at the current density of 6 A/g after 60 cycles of rate test. This value is 10 times the initial current density. However, further increase in current densities to 12 A/g for charging was found to be detrimental to the performance of the electrode with capacity of close to 200 mAh/g. These results clearly show excellent performance of the Si-based anodes at higher charging rates or current density.

Figure 7:
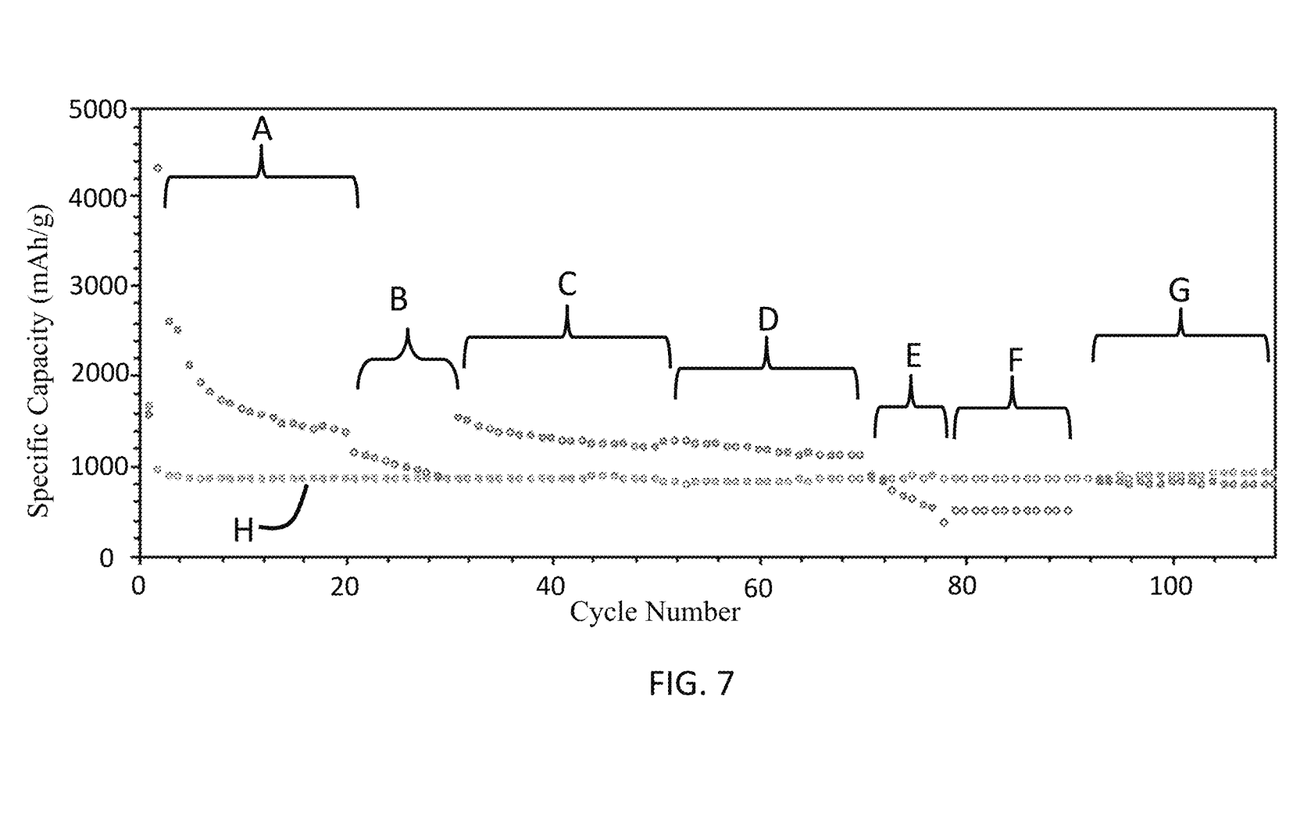
FIG. 7 depicts a comparison of cycling performances of cells using a carbon coated anode prepared in accordance with this disclosure using silicon powder milled for 24 hours.

To demonstrate the behavior of an anode prepared from the carbon coated silicon powder at elevated temperatures, testing at greater than 20° C. was carried out. The anode used in this testing was prepared from the 24-hour milled silicon powder with the described carbon coating. Testing was carried out as reflected in FIG. 7 at various temperatures between 20° C. and 60° C. at 10° C. intervals and compared to another anode prepared from the same material tested consistently at room temperature. All tests were carried out in a temperature-controlled chamber. A thermocouple located adjacent to the cell monitored the temperature. All cycling data was recorded after the cell had stabilized at a consistent temperature for at least one hour. In FIG. 7, bracket A provides the test results for a temperature setting of 40° C. and the first 20 cycles. Bracket B provides the test results for a temperature setting of 22° C. and cycle numbers 21-30. Bracket C provides the test results for a temperature setting of 50° C. and cycle numbers 31-50. Bracket D provides the test results for a temperature setting of 60° C. and cycle numbers 51-70. Bracket E provides the test results for a temperature setting of 30° C. and cycle numbers 71-80. Bracket F provides the test results for a temperature setting of 20° C. and cycle numbers 81-90 and Bracket G provides the test results for a temperature setting of 25° C. and cycle numbers 91-110. Line H represent cycling at room temperature.

Initially the temperature was set to 40° C., similar to the commonly observed summer temperature. The initial jump in capacity could be due to accelerated reaction due to higher temperature or related to better conductivity of the cell. After 20 test cycles at 40° C., the capacity reached a value of about 1370 mAh/g. The same electrode tested at room temperature retained about 840 mAh/g after 20 cycles. After another 20 cycles at 40° C., when the cell was tested at room temperature for another 10 cycles one could observe the matching capacity of both the cells at the end of 10 cycles. Subsequently, this cell was tested at 50° C. and showed an enhanced capacity of 1470 mAh/g. After an additional 20 cycles of testing at the same 50° C., the cell had a capacity of ~1200 mAh/g. Thus, the cell tested at 50° demonstrated a higher capacity than the cell tested at room temperature after similar number of cycles. An additional small jump in capacity to ~1260 mAh/g was demonstrated when the temperature was further increased to 60° C. After cycling at this temperature for an additional 20 cycles, the reversible capacity reached a value close to 1100 mAh/g. A subsequent decrease in temperature from 60° C. to 30° C. and then to 20° C. resulted in a reduced capacity. When the temperature was increased again to 25° C., the cell capacity reached a value close to the room temperature data. Throughout the test it can be seen that the cell shows better performance when exposed to higher (up to 60° C.) than room temperature. As depicted, even though the cell has gone through different levels of alternating high and low temperature during testing it retained its original value (tested throughout at RT) even after 100 cycles. In addition, higher capacities are recorded at higher temperatures than at room temperature. It is well known that the state of charge changes with number of cycles. Therefore, the loss in capacity due to cycling is actually overcome by the performance of the battery at temperatures higher than the room temperature.

Figure 8:
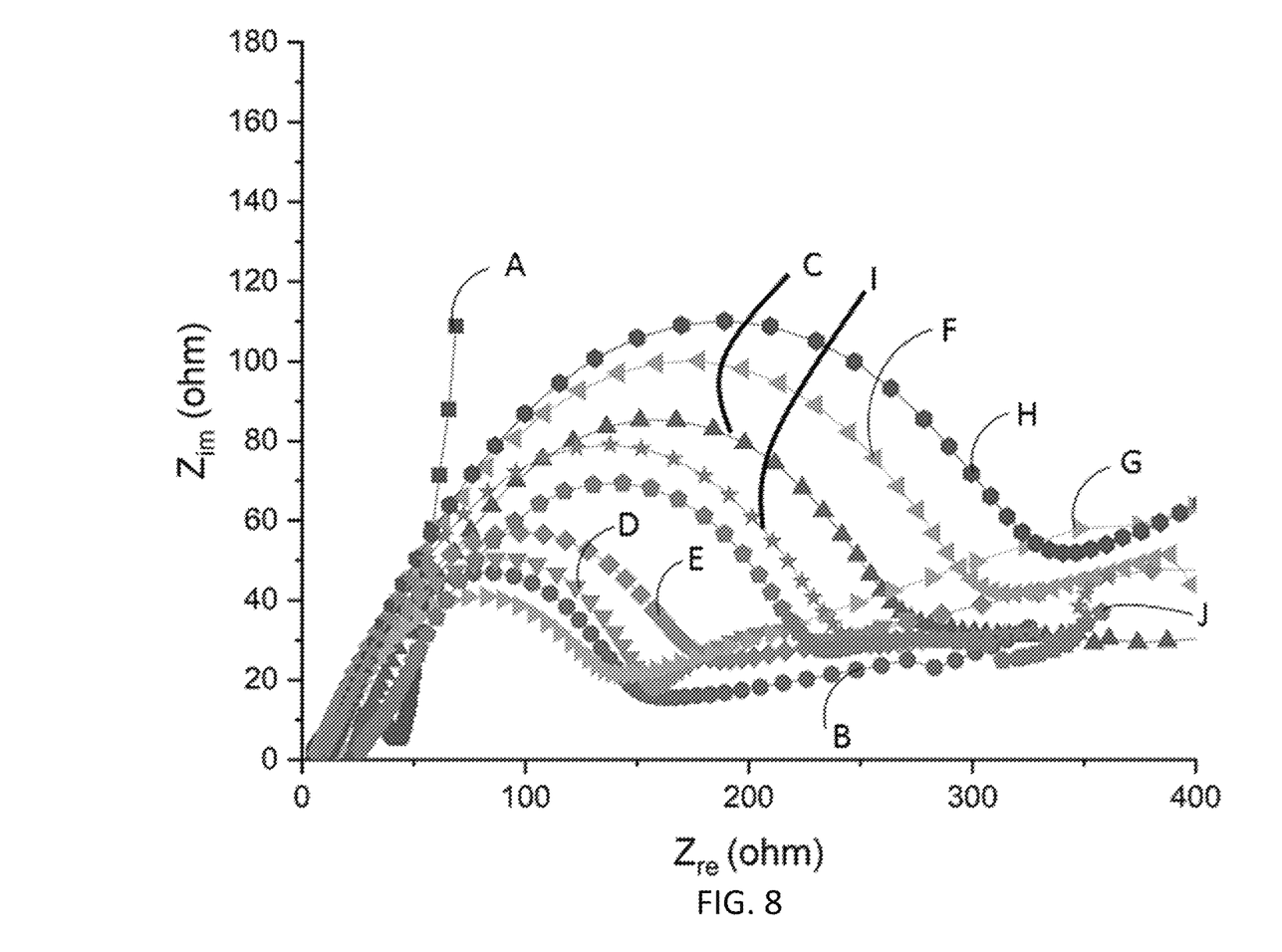
FIG. 8 depicts the electrochemical impedance spectra of a carbon coated anode prepared in accordance with this disclosure using silicon powder milled for 24 hours at different temperatures and different number of cycles.

The cell used for testing at different temperatures was also investigated at regular intervals using electrochemical impedance spectroscopy as shown in FIG. 8. In FIG. 8, lines A-J represent the following: Line A—room temperature prior to cycling; Line B—at 40° C. after 20 cycles at 40° C.; Line C—at room temperature after 20 cycles at 40° C.; Line D—at room temperature after 10 cycles at room temperature; Line E—at 50° C. after 20 cycles at 50° C.; Line F—at room temperature after 20 cycles at 50° C.; Line G—at 60° C. after 20 cycles at 60° C.; Line H—at room temperature after 20 cycles at 60° C.; Line I—at 20° C. after 20 cycles (10 cycles at 30° C. and 10 cycles at 20° C.); Line J—at 25° C. after 20 cycles at 25° C.

Figure 9:
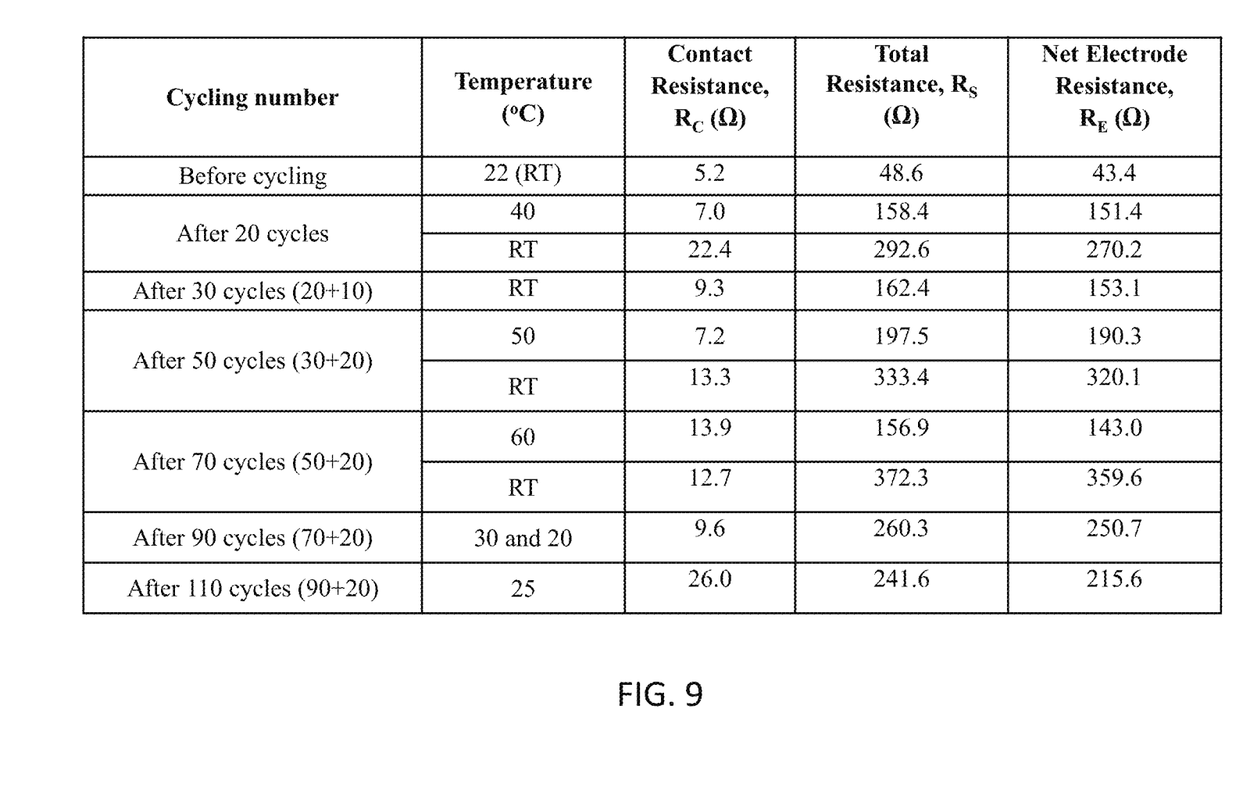
FIG. 9 provides a table with the electrochemical impedance parameters obtained from FIG. 8 for the carbon coated anode prepared in accordance with this disclosure using silicon powder milled for 24 hours.

The impedance data derived from FIG. 8, at different temperatures and number of testing cycles, are given in the Table provided in FIG. 9. The impedance spectra were taken twice when the cell was tested at higher temperatures (≥RT). The first at the higher temperature at which the test was performed and the second at the room temperature. Whenever the impedance spectra were taken after certain number of cycles at the higher temperature as well as room temperature there is up to 2.5 fold increase in net electrode resistance when tested at room temperature after a fixed number of cycles at higher temperatures. Usually after a certain number of cycles it is expected to get similar resistance values if not the same. But the results show two different values far apart from each other. These lower resistance values at higher temperature are in fact in good agreement with the higher capacity values observed in the discussions on the electrochemical performance. It is reasonable to imagine that a lower resistance electrode would be expected to have higher capacity. A higher temperature is expected to decrease the resistance for materials showing semiconducting (Si) and ionic conduction (electrolyte).

Figure 10:
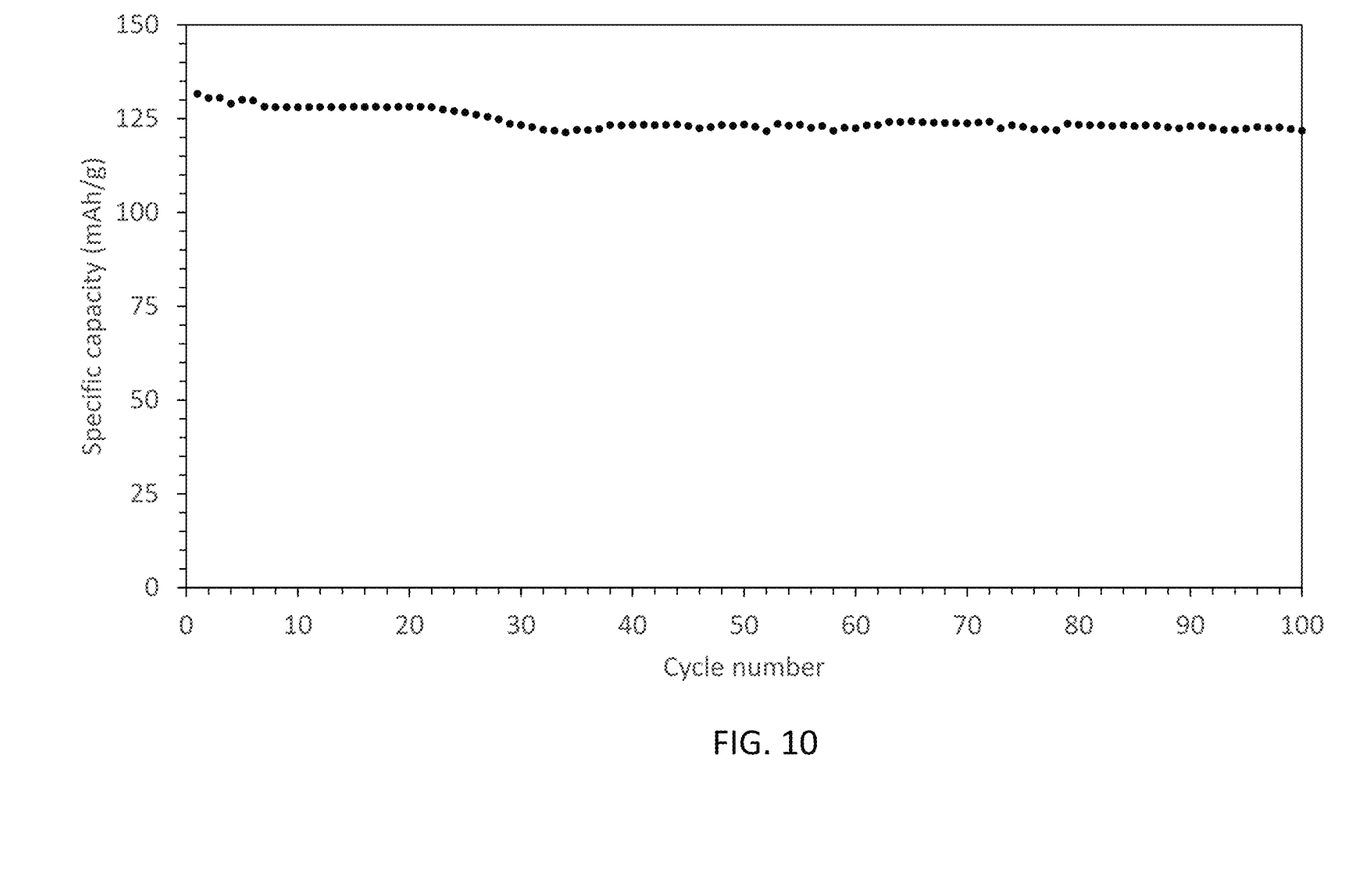
FIG. 10 depicts the cycling performance of Toda NCM 523 ($LiNi_{0.5}Co_{0.2}Mn_{0.3}O_2$) cathode in a half cell.

Full cell performance was tested using an anode prepared from the 24-hour milled silicon powder with the described carbon coating. The anode was tested against an NCM cathode (Toda NCM 523). Full cell performance depends on both the cathode and anode materials. A half cell was used in order to study the performance of the cathode alone as shown in FIG. 10. The NCM cathode shows a reversible capacity of ~122 mAh/g after 100 cycles with a capacity retention of more than 92%. Therefore, we have a good NCM cathode material to use in a full cell testing against the anode prepared from the 24-hour milled silicon powder with the described carbon coating.

Figure 11:
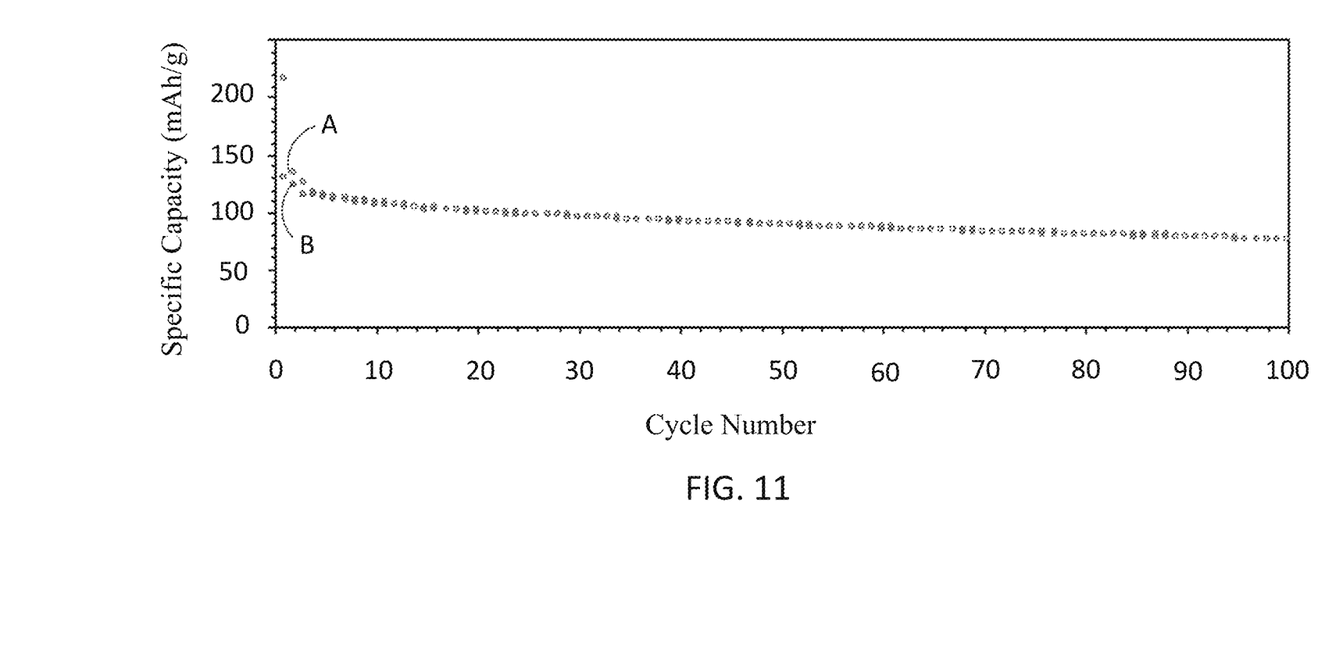
FIG. 11 depicts the cycling performance of full cell utilizing the carbon coated anode prepared in accordance with this disclosure using silicon powder milled for 24 hours and Toda NCM 523 ($LiNi_{0.5}Co_{0.2}Mn_{0.3}O_2$) cathode. Specific capacities were calculated according to the mass of NCM cathode.

To demonstrate the practical application, the same cathode was employed in the full cell against the anode prepared from the 24-hour milled silicon powder with the described carbon coating. FIG. 11 demonstrates the cycling performance of the full cell, where the specific capacities are calculated according to the mass of NCM based cathode. In FIG. 11 Line A represents the charge capacity and Line B represents the discharge capacity. As depicted in FIG. 11, the lines substantially overlap. The full cell capacity decreases gradually and attained a very stable reversible capacity of ~76 mAh/g after 100th cycles, which is comparable to those of reported full cells based on silicon anodes.

The carbon coating on the surface of silicon particles increased the overall conductivity and also precluded the direct contact of silicon with the electrolyte. Direct contact of silicon with electrolyte is known to cause uncontrolled SEI formation when fractured. The increase in overall conductivity of the electrode by the superconducting carbon as well as coated carbon provided channels for electron transport. Additionally, the direct contact between the carbon and electrolyte prevents uncontrolled SEI growth, which could be detrimental if there are any agglomerated silicon particles. The porous electrode structure created by the superconducting carbon particles and the coated carbon layer on the milled silicon powder helped in accommodating the volume change of silicon and provided access to electrolyte, which facilitated in getting higher capacity especially at higher charging rates.

Other embodiments of the present invention will be apparent to one skilled in the art. As such, the foregoing description merely enables and describes the general uses and methods of the present invention. Accordingly, the following claims define the true scope of the present invention.

What is claimed is:

1. An anode active material composition comprising:
   particles of silicon powder;
   a dopant within said particles of silicon powder, said dopant selected from the group consisting of boron, phosphorous and mixtures thereof;
   particles of superconducting carbon powder;
   a carbon coating layer on each of said particles of silicon powder, wherein said carbon coating layer encapsulates at least one particle of the particles of superconducting carbon powder and said carbon coating layer substantially encapsulates each of said particles of silicon powder.

2. The composition of claim 1, wherein said carbon coating layer on each of said particles of silicon powder encapsulates a plurality of said particles of superconducting carbon powder and encapsulates each of said particles of silicon powder.

3. The composition of claim 1, wherein said particles of silicon powder range in size from about 0.1 µm to about 0.5 µm.

4. The composition of claim 1, wherein said particles of superconducting carbon range in size from about 5 nm to about 100 nm.

5. The composition of claim 1, wherein said substantially encapsulated silicon powder particle has a size between about 0.5 µm and about 2 µm.

6. The composition of claim 2, wherein said encapsulated silicon powder particle has a size between about 0.5 µm and about 2 µm.

7. The composition of claim 1, wherein said particles of silicon powder are is selected from the group consisting of: crystalline silicon, polycrystalline silicon and mixtures thereof.

8. An anode comprising:
   an anode active material, said anode active material comprises:
      particles of silicon powder, said particles of silicon powder range in size from about 0.1 µm to about 0.5 µm;
      a dopant within said particles of silicon powder, said dopant selected from the group consisting of boron, phosphorous and mixtures thereof;
      particles of superconducting carbon, said particles of superconducting carbon range in size from about 5 nm to about 100 nm;
      and a carbon coating on each of said particles of silicon powder, wherein said carbon coating encapsulates a particle of silicon powder and encapsulates a plurality of superconducting carbon particles such that the anode active material has a particle size of about 0.5 µm to about 2 µm;
   a binder; and,
   a metal foil.

9. The anode of claim 8, wherein said anode has a reversible capacity of about 1050mAh/g after 200 cycles and an initial capacity of 1658mAh/g when tested against Li/Li$^+$ with a voltage cutoff set to between 1.5V and 1 mV and a current setting of 0.8 A/g.

10. The anode of claim 9, wherein said anode has a resistance level of ≤100Ω.

11. The anode of claim 9, wherein said anode has a resistance level of about 68Ω and an initial resistance of about 300.

12. The anode of claim 8, further comprising superconducting carbon powder separate from said anode active material.

13. The anode of claim 8, wherein said said particles of silicon powder are selected from the group consisting of: crystalline silicon, polycrystalline silicon and mixtures thereof.

14. The anode of claim 8, wherein said anode active material is from about 10 to about 85 weight percent of said anode.

15. An anode active material comprising:
    a carbon coated particle;
    a silicon powder particle having a size between about 0.1 μm and about 0.5 μm;
    a dopant within said silicon powder particle, said dopant selected from the group consisting of boron, phosphorous and mixtures thereof;
    a plurality of superconducting carbon particles, said plurality of superconducting carbon particles having sizes between about 5 nm and about 100 nm;
    said carbon coated particle having an overall size between about 0.5 μm and about 2 μm.

16. The anode of claim 13, wherein said plurality of superconducting carbon particles has a conductivity of about 2-4×10$^5$Sm$^{-1}$.

17. The anode of claim 15, wherein said silicon powder particle is selected from the group consisting of: crystalline silicon and polycrystalline silicon.

18. An anode comprising:
    an anode active material, said anode active material comprises:
        carbon coated particles, substantially each of said carbon coated particles comprise:
            a silicon powder particle;
            a dopant within said silicon powder particle, said dopant selected from the group consisting of boron, phosphorous and mixtures thereof;
            a carbon coating on said silicon powder particle;
            a plurality of superconducting carbon particles, said plurality of superconducting carbon particles are encapsulated by said carbon coating;
    a binder; and,
    a metal foil.

19. The anode of claim 18, wherein said silicon powder particle having a size between about 0.1 μm and about 0.5 μm.

20. The anode of claim 18, wherein said plurality of superconducting carbon particles have sizes between about 5 nm and about 100 nm.

21. The anode of claim 18, wherein said carbon coated particles have sizes between about 0.5 μm and 2 μm.

22. The anode of claim 18, wherein said anode has a reversible capacity of about 1050mAh/g after 200 cycles and an initial capacity of 1658mAh/g when tested against Li/Li$^+$ with a voltage cutoff set to about 1.5V and 1 mV and a current setting of 0.8 A/g.

23. The anode of claim 22, wherein said anode has a resistance level of ≤100Ω.

24. The anode of claim 22, wherein said anode has a resistance level of about 68Ω and an initial resistance of about 30Ω.

25. The anode of claim 18, further comprising additional superconducting carbon powder separate from said carbon coated particles.

26. The anode of claim 18, wherein said silicon powder particle is selected from the group consisting of: crystalline silicon, polycrystalline silicon and mixtures thereof.

27. The anode of claim 18, wherein said carbon coated particles are from about 10 to about 85 weight percent of said anode.

* * * * *

UNITED STATES PATENT AND TRADEMARK OFFICE
CERTIFICATE OF CORRECTION

PATENT NO. : 12,170,366 B2
APPLICATION NO. : 17/420603
DATED : December 17, 2024
INVENTOR(S) : Malay Jana and Raj N. Singh Page 1 of 1

It is certified that error appears in the above-identified patent and that said Letters Patent is hereby corrected as shown below:

In the Claims

Column 11, Line 10: delete "300" and insert therefor --30 Ω--.

Signed and Sealed this
Fourth Day of February, 2025

Coke Morgan Stewart
*Acting Director of the United States Patent and Trademark Office*